Jan. 23, 1923.

F. A. FRANZÉN.
LOCK FOR NUTS AND SCREWS.
FILED OCT. 12, 1921.

1,442,881

Inventor:
Frans August Franzén
By Emil Rommel
Attorney.

Patented Jan. 23, 1923.

1,442,881

UNITED STATES PATENT OFFICE.

FRANS AUGUST FRANZÉN, OF LUND, SWEDEN.

LOCK FOR NUTS AND SCREWS.

Application filed October 12, 1921. Serial No. 507,188.

*To all whom it may concern:*

Be it known that I, FRANS AUGUST FRANZÉN, a citizen of Sweden, and residing at Lund, in the county of Malmohus, Kingdom of Sweden, have invented a certain new and useful Lock for Nuts and Screws, of which the following is a specification.

My invention relates to a lock for nuts and screws, said lock being of a very simple and efficient construction; and by means of the same it will be possible to positively lock a nut or screw in any position and to lock and release the same an unlimited number of times without damaging the nut or screw and without deforming any of the parts so that they must be substituted.

Figure 1:
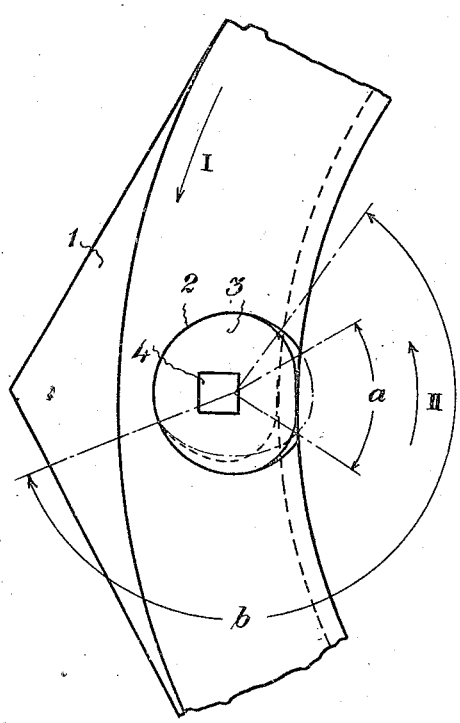
Figure 2:
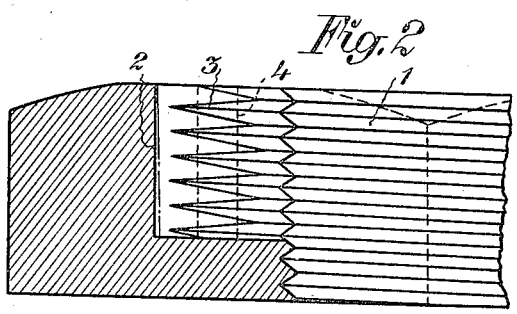
Figure 3:
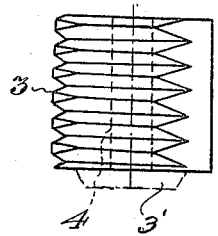
Figure 4:
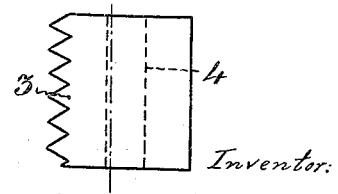

The invention is illustrated in the accompanying drawing, which, for the sake of clearness, shows the same on a very large scale. In said drawing Fig. 1 is a fragmentary plan view of a nut provided with the locking device in question and Fig. 2 is a vertical sectional view of the same. Figs. 3 and 4 are two side views of the locking member proper, said views being taken at right angle to each other.

The nut 1, shown in the drawing, is provided with right-hand threads as usual; and parallel to its axis within the body of the nut there is provided a smaller bore 2 which may be either cylindrical, as shown in full lines in Fig. 2, or conical as indicated in dotted lines in that figure, and having a smooth inner surface, said bore 2 intersecting the larger threaded bore in the nut so that an opening is thereby formed between the two bores, for instance along the angle *a* shown in Fig. 1. A pin 3 fitted in the bore 2 is provided with thread-shaped grooves, more fully described below, and with an axially arranged hole 4 of polygonal section, so that the pin may be turned by means of a suitable key or wrench. The pin 3 is oval in cross section and its major axis is of substantially the same length as the greatest diameter of the bore 2, the minor axis being approximately of the same length as the smallest diameter of said bore, taking into consideration the diagrammatic showing in Fig. 1, in which the said major axis forms a right angle to, and the minor axis coincides with, the radius of the nut passing through the centre of the bore 2.

It is worthy of remark and might be clearly understood from the following that in cross section the pin 3 needs not to be a symmetrical oval or ellipse, as a substantially oval or elliptical form is needed only on the one side of a longitudinal plane through the major axis, i. e. the right-hand side, which is the one facing the threaded bore in the nut. On the other or left-hand side of said major axial plane, the pin may be semi-cylindrical; and this modified form is to be preferred as in this case the surface resting against the inner wall of the bore 2 will be enlarged and the locking pressure per unit of surface diminished.

The pin 3 is provided with threads, and such threads may extend around the whole circumference of the pin; but for obtaining an enlarged contact surface the threads are arranged along the angle *b* in Fig. 1 only, the other part of the circumference being smooth. It will be understood however that the same enlarged resting or contact surface may be obtained even if the pin were provided with threads all around, provided that the bore 2 also is threaded correspondingly. Thus it is not necessary that the bore 2 shall have a smooth inner surface, but it may also be provided with threads or grooves, although this is not necessary with regard to the working described below; and from the point of view of manufacture it may preferably be omitted.

If the nut 1 is provided with right-hand threads, the pin 3 is to be given a left-hand thread or provided with grooves corresponding to left-hand threads and vice versa, and the distance between two neighboring grooves must substantially correspond to the pitch of the nut. Besides the grooves of the pin must have approximately the same or a somewhat larger angle of inclination in relation to a plane perpendicular to the axis of rotation than the threads of the nut, as will be seen in Fig. 2.

The mode of operation is as follows:—

When the nut 1 is screwed tight, provided that it is right-hand threaded, it is rotated in a direction opposite to the arrow I, shown in Fig. 1. Previous to the tightening of the nut the pin 3 is placed within the bore 2 and given a position in which its major axis is perpendicular to the radius of the nut passing through the centre of said bore. The threads or grooves of the pin should be arranged in such a manner in relation to the total length of the same and the depth of the bore 2 that they, when the pin is assuming the position just described, coincide with the longitudinal direction of the threads within the nut (compare Fig. 2). Then the nut may be freely tightened without hindrance from the side of the pin, and if the latter should tend to rotate it may be arrested by suitable means during the tightening. When the nut has been tightened to the required extent, a suitable key is introduced within the hole 4 and the pin is rotated in the direction of the arrow II (Fig. 1) as far as possible towards the position shown in dot and dash lines. When correctly dimensioned with regard to the play permitted the pin ought to be rotated somewhat less than 90° (say about 70°) whereafter the continued rotation is prevented by the threads or grooves of the pin pressing too tightly against the threads of the screw. When the nut is about to get loose, it tends to rotate in the direction of the arrow I; but on account of the friction between the pin 3 and the screw, such a rotation tends to turn the pin further in the direction of the arrow II, whereby the locking effect will be rendered still greater than before.

When turning the pin as described above, its threads or grooves act in a manner tending to press the pin against the bottom of the bore 2, because of which pressure friction is set up between the inner end of the pin and the bottom of the bore, this friction practically preventing the pin from being turned back again. Since the threads or grooves of the pin are inclined in the opposite direction to the threads of the nut, the said axial displacement will take place also if the grooves of the pin are true in alignment with the threads of the nut. For obtaining a better locking action on the pin, the inner end of the same may be provided with a sharp edge 3' (Fig. 3) such as commonly used in set screws, so that said edge will cut into the bottom of the bore; but the pin may also be positively locked by means of a common set screw or in any other suitable manner, for instance by means of a spring washer placed between the end of the pin and the bottom of the bore.

In the drawing the bore 2 does not entirely extend through the nut, and this construction is chosen so as to maintain the largest cross sectional area of the nut body and thereby to reduce its strength as little as possible. When comparatively heavy nuts can be used, or in the case of nuts not exposed to heavy strains, the bore 2 may extend entirely through the nut and the pin 3 may likewise be extended so as to permit it to act in the manner of a set screw, the inner or lower end of the pin contacting directly with the surface against which the nut is to be tightened. This arrangement will obviously increase the locking action on the nut.

Although the invention has been described above as used for locking a nut, the same will obviously be useful also for the locking of a screw. Then the construction will be entirely the same as described and the locking member or pin 3 will be located within a bore arranged in the body in which the screw is intended to be placed. A nut may also be locked in any position without being tightened against any abutting surface, and in the same manner a screw may be locked without being entirely screwed up until its head rests against an abutting surface. The same nut or screw may also be locked by means of more than one of the devices described above.

The locking device described above is very efficient for locking screws or nuts completely tightened, so that their further rotation in the same direction is made impossible; and for screws and nuts exposed to torsional stresses in one direction only, i. e. in the direction for loosening the same. The efficiency is however not so great if the invention is used in combination with nuts or screws not entirely tightened, or if they are exposed to torsional stresses alternating in opposite directions.

In order to explain this fact, reference is to be had to the use in combination with a nut which has not been completely tightened, so that its further rotation is not made impossible, for instance a free nut upon a threaded spindle. Provided this nut, if right-hand threaded, is locked in the manner described above, it cannot be turned left-hand; but if exposed to torsional stresses in the right-hand direction these stresses must not assume any very high value before the locking member, on account of the friction between the same and the screw or spindle, is turned back from its locking position, rolling upon the spindle without hindrance from the friction between the locking member and the bore within which it is inserted. After the locking member has thus been turned back, the nut of course is free to rotate also in the left-hand direction.

From the statements given above it will be seen that for removing this drawback it is necessary in some manner to obtain a friction between the locking member and its bore, which after the locking of the nut is greater than the highest value of the friction between the locking member and the screw or spindle. Further, for the sake of facilitating the locking, it is of course a great improvement if the friction between the locking member and its bore, before said member has been turned into its locking position, is as small as possible. In other words, the said friction should have a minimum value previous to and during the main part of the locking motion, but should rapidly assume a sufficient maximum value at the end of said motion.

This may be effected by giving the locking pin a slightly conical form, as will be understood from the dotted-line showing in Fig. 2, and so disposing it that its apex will turn against the bottom of the hole in which it is inserted, said hole being given approximately the same taper. By the wedging action arising on account of said taper form during the rotation of the locking member in the direction for locking the nut, a friction arises between said member and its hole, which friction may assume a value many times higher than the value of the friction between the locking member and the screw or spindle; and by a correct dimensioning, the first-mentioned friction can be caused to increase in the manner described above, so that its maximum value is rapidly reached at the end of the locking motion.

Practical tests have shown that in common iron or red metal nuts, when using a comparatively slight taper on the pin and its hole and if the bottom of the latter does not prevent the longitudinal displacement of the pin, the friction between the pin and its hole may become so great that the material of the pin cannot resist the stresses, which must be applied for turning it back from its locking position. In order to avoid the necessity of cutting the nut or locking pin in order to release the same if desired, the depth of the hole in relation to the length of the pin should be chosen in such a manner that said bottom prevents the intrusion of the pin beyond a certain limit, and said limit might be so chosen that the further intrusion of the pin is prevented when said pin is turned into its fully locking position. The bottom of the hole referred to above may also be the surface against which the nut is tightened, in case of using nuts provided with holes extending right through the same.

Having now described my invention and the manner, in which the same is to be performed, I declare that what I claim is:—

1. An improved lock for nuts and screws comprising a body surrounding the screw and having a bore with a smooth inner surface, said bore having its axis substantially parallel to the threaded bore for receiving the screw and intersecting the same so that an opening is formed between said bores, and a rotatable locking pin inserted in the bore first mentioned and having at least at one side an oval cross sectional area, the major axis of which is of substantially the same length as the diameter of the said first-mentioned bore, the oval side of the pin having thread-like grooves therein of approximately the same size and shape as the threads of the screw-receiving bore but being inclined in the opposite direction, so that if the said screw-receiving bore is provided with right-hand threads the grooves in said pin will be inclined left-handed, and vice versa.

2. An improved lock for nuts and screws comprising a body surrounding the screw and having a bore with a smooth inner surface, said bore having its axis substantially parallel to the threaded bore for receiving the screw and intersecting the same so that an opening is formed between said bores, and a rotatable locking pin inserted in the bore first mentioned and having a cross sectional area one half of which is semi-circular and the other half oval, the major axis of the latter half and the diameter of the former half being of substantially the same length as the diameter of the bore receiving the locking pin, the oval side of said pin being provided with thread-like grooves of approximately the same size and shape as the threads within the screw-receiving bore but being inclined in the opposite direction.

3. An improved lock for nuts and screws comprising a body surrounding the screw and having a bore with a smooth inner surface, said bore having its axis substantially parallel to the threaded bore for receiving the screw and intersecting the same so that an opening is formed between said bores, the bore first mentioned being of such a depth that it does not entirely extend through the body surrounding the screw but forms a bottom surface therein, and a rotatable locking pin inserted in said first mentioned bore and resting against said bottom surface, the cross sectional area of said pin at the one side of the diameter being semi-circular and at the other side forming an oval, and the said diameter, which also forms the major axis of said oval, being of substantially the same length as the pin-receiving bore, the oval side of the pin having thread-like grooves therein of approximately the same size and shape as the threads of the screw-receiving bore and being placed, in relation to the length of the locking pin and the depth of its receiving bore, in such a manner that the ridges between the grooves are substantially in alignment with the threads within the screw-receiving bore when the locking pin rests against the bottom of its receiving bore and when turned so that the major axis of its oval side is substantially perpendicular to the radius of the screw-receiving bore through the axis of rotation of the pin.

4. An improved lock for nuts and screws comprising a body surrounding the screw and having a bore with a smooth inner surface, said bore having its axis substantially parallel to the threaded bore for receiving the screw and intersecting the same so that an opening is formed between said bores, and a rotatable locking pin inserted in the bore first mentioned and having a cross sectional area, one half of which is semi-circular and the other half oval, the major axis of the latter and the diameter of the former being of substantially the same length as the diameter of the pin-receiving bore, the inner end of said pin having a sharp working edge, the oval side of the pin having thread-like grooves therein of approximately the same size and shape as the threads of the screw-receiving bore but being inclined in an opposite direction.

5. An improved lock for nuts and screws comprising a body surrounding the screw and having a bore with a smooth inner surface, said bore having its axis substantially parallel to the threaded bore for receiving the screw and intersecting the same so that an opening is formed between said bores, and a rotatable locking pin inserted within the bore first mentioned and having a cross sectional area one half of which is semi-circular and the other half oval, the major axis of the latter half and the diameter of the former half being of substantially the same length as the diameter of the pin-receiving bore, said pin having a longitudinal hole of polygonal cross-section to receive a suitable key, and the oval side of the pin having thread-like external grooves of approximately the same size and shape as the threads within the screw-receiving bore for taking up the screw but being inclined in the opposite direction.

6. An improved lock for nuts and screws comprising a body surrounding the screw and having a slightly conical bore, said bore having its axis substantially parallel to the threaded bore for receiving the screw and intersecting the same so that an opening is formed between said bores, and a rotatable locking pin inserted within the conical bore and tapered substantially in conformity to the taper of that bore and having at least on one side an oval cross sectional area, the major axis of which is of substantially the same length as the diameter of the pin-receiving bore, the oval side of the pin having thread-like grooves of approximately the same size and shape as the threads within the screw-receiving bore but being inclined in an opposite direction.

7. An improved lock for nuts and screws comprising a body surrounding the screw and having a slightly conical bore, said bore having its axis substantially parallel to the threaded bore for receiving the screw and intersecting the same so that an opening is formed between said bores, and a rotatable locking pin inserted within the conical bore and tapered substantially in conformity to the taper of that bore, said pin having a cross sectional area one half of which is semi-circular and the other half oval, the major axis of the latter and the diameter of the former being of substantially the same length as the diameter of the pin-receiving bore, said pin being rotatable within its bore and having thread-like grooves provided on its oval side, said grooves being approximately of the same size and shape as the threads of the screw-receiving bore but inclined in an opposite direction.

8. An improved lock for nuts and screws comprising a body surrounding the screw and having a slightly conical bore, said bore having its axis substantially parallel to the threaded bore for receiving the screw and intersecting the same so that an opening is formed between said bores, and a rotatable locking pin inserted within the conical bore and tapered substantially in conformity to the taper of that bore, said pin having a cross sectional area one half of which is semi-circular and the other half oval, the oval side of the pin having thread-like grooves, and the bottom of the bore in which said pin is inserted being engaged by the inner end of the pin when the latter has been turned into its full locking position to prevent the further insertion of the pin.

In testimony whereof, I have signed my name to this specification in the presence of two subscribing witnesses.

FRANS AUGUST FRANZÉN.

Witnesses:
G. BRANZELL,
ERNST PEIROT.